United States Patent [19]

Spies

[11] Patent Number: 4,945,309

[45] Date of Patent: Jul. 31, 1990

[54] METHOD OF REDUCING IMPULSIVE NOISE IN ELECTROMAGNETIC GEOPHYSICAL DATA

[75] Inventor: Brian R. Spies, Plano, Tex.

[73] Assignee: Atlantic Richfield Company, Los Angeles, Calif.

[21] Appl. No.: 393,559

[22] Filed: Aug. 14, 1989

[51] Int. Cl.$^5$ .............................................. G01V 3/00
[52] U.S. Cl. .................... 324/345; 324/347
[58] Field of Search ............. 324/334, 336, 337, 345, 324/347, 348, 349, 350, 357, 360, 363

[56] References Cited

U.S. PATENT DOCUMENTS 4,247,821  1/1981  Buselli ................................ 324/336
4,339,720  7/1982  Halverson ........................... 324/362
4,812,766  3/1989  Klien .................................... 324/349

OTHER PUBLICATIONS

Nichols, Morrison, and Clarke, "Signals and Noise in Magnetotellurics", Society of Exploration Geophysicists, Fifty-Fifth Annual International Meeting and Exposition, 1985.

Primary Examiner—Reinhard J. Eisenzopf
Assistant Examiner—Walter E. Snow
Attorney, Agent, or Firm—Geoffrey A. Mantooth

[57] ABSTRACT

A method for reducing impulsive noise in electromagnetic geophysical data utilizes a receiving antenna and one or more noise sensors. The type of noise sensor used depends on the type of impulsive noise which is to be monitored. Motion noise is monitored with a tilt meter or similar motion sensor. Impulsive electromagnetic noise is monitored with an electric or magnetic field sensor which is located so as to receive impulsive noise while minimizing the reception of the electromagnetic signal of interest. Impulsive noise is monitored without the electromagnetic signal of interest for a short period of time to enable the determination of a threshold noise value. Then, the impulsive noise is monitored simultaneously with the electromagnetic signal of interest, wherein the impulsive noise is received by the noise sensor and the signal of interest is received by the receiving antenna. The output of the noise sensor is used to determine the occurrence of impulsive noise in the output of the receiving antenna, wherein the impulsive noise portion of the signal record can be deleted.

13 Claims, 1 Drawing Sheet

METHOD OF REDUCING IMPULSIVE NOISE IN ELECTROMAGNETIC GEOPHYSICAL DATA

FIELD OF THE INVENTION

The present invention relates to methods of reducing impulsive noise, such as is caused by sensor motion, vehicular noise, and sferics, in electromagnetic geophysical data.

BACKGROUND OF THE INVENTION

In electromagnetic geophysical exploration, electromagnetic signals are received and processed to provide an indication of the underlying geology. The electromagnetic signals can be either naturally produced, as in the case of magnetotelluric exploration, or artificially produced, as in the case of controlled-source electromagnetic exploration. The electromagnetic signals are received by one or more receiving sensors, which are typically placed on the ground. The receiving sensor is typically either a magnetometer, which measures the magnetic field, or an induction coil, which measures the time rate of change of the magnetic field.

The receiving sensor and the resulting data produced by the sensor in an electromagnetic geophysical survey system are susceptible to impulsive noise from a variety of sources. One common type of impulsive noise is referred to as motion noise. Motion noise is caused by movement of the receiving sensor in the earth's magnetic field The receiving sensor can be moved by wind gusts, microseismic activity in the ground, nearby vehicular traffic (particularly if the receiving sensor is located near a road) and nearby foot traffic. In the prior art, attempts have been made to protect the receiving sensor from motion noise by placing it in a lined pit beneath the surface of the ground. Such a procedure is not only too time consuming and expensive, but ineffective as well, because the receiving sensor still exhibits motion noise. Other types of impulsive noise include sferics, which are caused by distant lightning, and perturbations of the earth's magnetic field caused by nearby vehicular traffic.

One type of prior art technique to reduce impulsive noise involves stacking the received electromagnetic data. In stacking, multiple received signals are averaged together; continuous non-impulsive noise is reduced to acceptable levels by averaging a certain number of signals. In order for the randomly occurring impulsive noise to be reduced sufficiently, a large number of received signals is typically needed. Practically, it is too time consuming and expensive to acquire enough data to effectively reduce impulsive noise to acceptable levels by stacking.

Another type of prior art technique is disclosed is Buselli et al. U.S. Pat. No. 4,247,821. A sferics detector is connected to the same receiving antenna that acquires the electromagnetic signal. When sferics noise causes the received electromagnetic signal to exceed a threshold, the sferics detector causes an analog-to-digital converter, that converts the received signal, to freeze. The problem with this technique is that the noise is monitored together with the electromagnetic signal of interest, and it is difficult to distinguish between the two signals. This makes it difficult to remove the noise. Furthermore, the impulsive noise introduces a bias into the data, which bias cannot be discerned.

SUMMARY OF THE INVENTION

It is an object of the present invention to provide a method for reducing impulsive noise in electromagnetic geophysical data.

The method of the present invention provides a receiving antenna means for receiving an electromagnetic signal and a noise sensor for receiving impulsive noise. The noise sensor is placed so as to receive the impulsive noise that is received by the receiving antenna means and so as to avoid receiving the electromagnetic signal. Then, the electromagnetic signal is received with the receiving antenna means so as to create a signal record and simultaneously the impulsive noise is received with the noise sensor so as to create noise record. The noise record is examined for occurrences of the impulsive noise by comparing the noise record with a threshold noise value. Those instances of time in which the noise record exceeds the threshold are identified. Those portions of the signal record which are simultaneous with the identified instances of time in which the noise record exceeds the threshold are removed from the signal record, wherein the signal record has reduced impulsive noise.

In one aspect, the impulsive noise comprises motion noise caused by movement of the receiving antenna means in the earth's magnetic field. In this aspect, the noise sensor means comprises a motion sensor. The motion sensor is firmly coupled to the receiving antenna means so as to detect movement of the receiving antenna means. In another aspect, the impulsive noise comprises electromagnetic impulsive noise. In this other aspect, the noise sensor means comprises electric or magnetic field sensor means.

In still another aspect, plural signal records are created along with simultaneous respective plural noise records. Each of the signal records is processed to remove impulsive noise by comparing the respective noise record with a predetermined threshold noise value. For each signal record, those portions which are simultaneous with identified instances of time in which the respective noise record exceeds the threshold are removed. The plural signal records are then stacked so as to produce a continuous processed electromagnetic signal.

With the method of the present invention, the impulsive noise is easily identified because a separate impulsive noise sensor is used. The electromagnetic noise sensor is located so as to minimize the reception of the electromagnetic signal of interest, thereby optimizing the reception of the impulsive electromagnetic noise. Because the noise is separately identified, there is no confusion between the noise and the electromagnetic signal of interest. The noisy portion of the signal can be eliminated and any bias in the data which would be otherwise be introduced by the noise is eliminated as well.

Furthermore, because the impulsive noise is of a finite (and typically short) duration, removal of the noisy portions of data produces only gaps of the same finite duration. These gaps in individual signal records can be eliminated by stacking plural signal records together to produce a continuous electromagnetic signal, free of impulsive noise.

Besides reducing the impulsive noise in geophysical data, the method of the preferred embodiment can increase the dynamic range of the electromagnetic geophysical receiving equipment. The impulsive noise is frequently 10 to 100 times larger in amplitude than is the electromagnetic signal of interest, wherein the gain of the amplifier in the receiver must be reduced to avoid saturation. The reduction in gain reduces the dynamic range of the receiving equipment. But, with the method of the preferred embodiment, the amplifier gain can be increased. The impulsive noise will be deleted from the data, so it is irrelevant if the amplifier is saturated by the noise. The amplifier quickly becomes unsaturated after the impulsive noise so that the electromagnetic signal of interest can be received with an unsaturated amplifier.

DESCRIPTION OF PREFERRED EMBODIMENT

Figure 1:
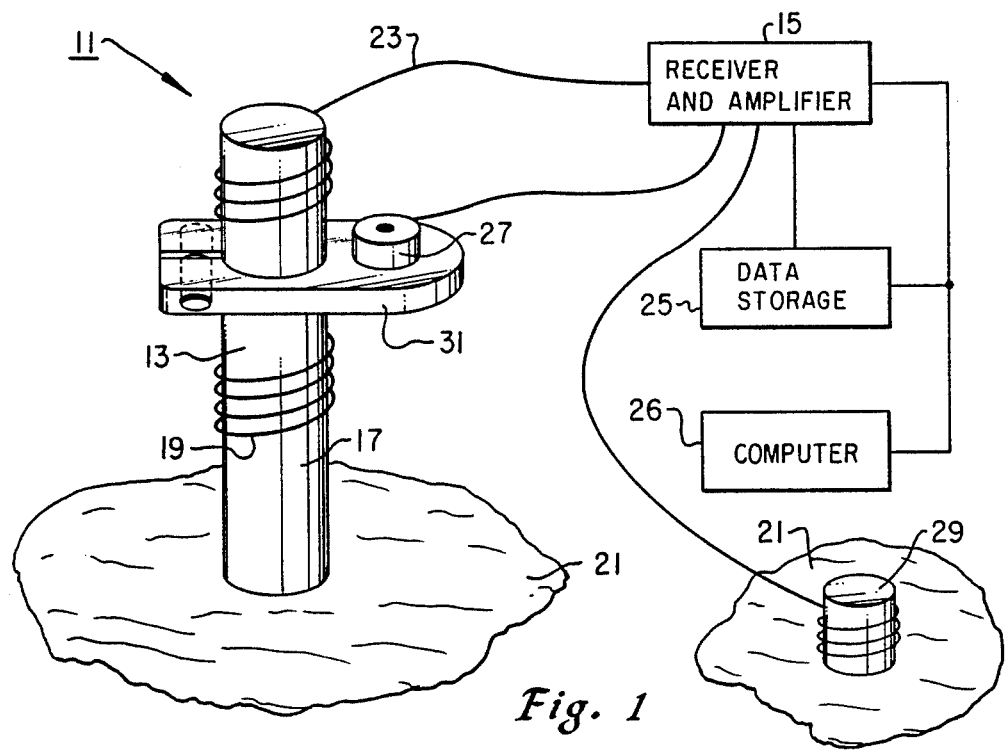
FIG. 1 is a schematic diagram of a preferred embodiment of the equipment used to practice the method of the present invention.

The method of the present invention is used to reduce impulsive noise in electromagnetic geophysical survey data. Survey data is obtained with electromagnetic geophysical exploration receiving equipment 11 such as is shown in FIG. 1. The receiving equipment 11 receives electromagnetic signals from the underlying earth 21. The electromagnetic signals are generated either naturally or artificially. In magnetotelluric exploration systems, natural electromagnetic signals are detected. The natural electromagnetic signals originate from natural ionospheric and magnetospheric sources. In controlled-source electromagnetic exploration systems, artificially produced electromagnetic signals are detected. A transmitter and a transmitting antenna (not shown) are used to generate the electromagnetic signals. The transmitter and transmitting antenna induce a current into the ground 21, the associated magnetic fields of which are detected by the receiving equipment 11.

The electromagnetic exploration receiving equipment 11 includes a receiving antenna 13 and a receiver 15. The receiving antenna 13 is typically a conventional magnetometer or a conventional induction coil. In FIG. 1, the receiving antenna 13 is shown as a current feedback magnetometer. The magnetometer 13 includes a tube 17 and a conductor 19 which is wound around the tube in a uniform direction. In FIG. 1, only portions of the conductor winding are shown for clarity. The magnetometer 13 is set vertically on the ground 21 with one end pointing up. Thus, any movement of the ground will also move the magnetometer 13. The magnetometer 13 has output conductors 23 that are connected to the receiver 15. The receiver 15 amplifies and filters the electromagnetic signals from the magnetometer 13. The electromagnetic signals can then be stored in a data storage unit 25 for subsequent processing. A computer 26 is provided to control the receiver 15 and to process the data.

There is also provided impulsive noise detectors 27, 29 near the receiving antenna 13. Impulsive noise is electromagnetic noise that is picked up by the receiving antenna 13 simultaneously with the electromagnetic signal of interest. Impulsive noise is frequently of a large amplitude, short duration and is characterized by abrupt changes. There are a number of sources of impulsive noise. One common type of impulsive noise is motion noise. The earth has a static magnetic field that is omnipresent over its surface. Thus, the magnetometer 13 is immersed on the earth's magnetic field. Any movement of the magnetometer will cause the earth's magnetic field to induce anomalous signals into the magnetometer 13. The magnetometer can be moved by wind gusts, microseismic activity in the ground, and nearby foot or vehicular traffic that shakes the ground 21. Wind gusts cause the magnetometer 13 to move by directly blowing on the magnetometer and also by causing the ground beneath the magnetometer to move. Another type of impulsive noise is sferics, which are caused by distant lightning and also by electrical activity in the ionosphere and the magnetosphere. Still another type of impulsive noise is perturbations in the ambient magnetic field around the magnetometer. Such perturbations, which are typically caused by nearby vehicular traffic, induce anomalous signals into the magnetometer.

The type of impulsive noise that is to be monitored will determine the type of detector used. For example, motion noise is monitored with a motion sensor 27 such as a tilt meter (which measures tilt), a seismometer, a geophone (which measures velocity), or an accelerometer (which measures acceleration). The motion sensor 27 is coupled firmly to the magnetometer 13 so that any motion of the magnetometer 13 will be transmitted to the motion sensor 27. In FIG. 1, the motion sensor 27 is coupled to a clamping member 31, which in turn is clamped to the tube 17 of the magnetometer. Sferics noise is monitored by an electric or magnetic field sensor 29 such as a magnetometer (shown in FIG. 1), a pair of electrodes, or an induction coil. Impulsive noise caused by perturbations in the ambient magnetic field is also monitored by the electric or magnetic field sensor 29. The noise sensor 29 is located so as to receive the impulsive noise while minimizing the reception of the electromagnetic signal of interest such that the electromagnetic signal of interest is of a much smaller amplitude that the impulsive noise. Minimizing the pickup of the electromagnetic signal can be accomplished in several ways. For example, the noise sensor 29 can be located at a distance from the receiving antenna 13 in order to minimize reception of electromagnetic signal of interest. The impulsive electromagnetic noise is typically coherent between the receiving magnetometer 13 and the noise sensor 29 so that even where the receiving antenna 13 and the noise sensor 29 are separated by a large distance, they will detect the same impulsive noise. Alternatively, the noise sensor 29 can be located near the receiving antenna 13, wherein the noise sensor is oriented to minimize the pickup of the electromagnetic signal of interest. For example, in controlled-source electromagnetic exploration using a receiving antenna 13 located in the center of a horizontal transmitting antenna, the noise magnetometer 29 is located adjacent to the receiving antenna and oriented so that the longitudinal axis of the magnetometer 29 will be horizontal. The same sensor 29 can be used to monitor sferics noise and noise caused by perturbations in the earth's magnetic field.

The outputs of the noise sensors 27, 29 are connected to the receiver 15. Each of the noise sensors has an input channel into the receiver 15. A plurality of impulsive noise sensors can be used to detect multiple types of impulsive noise.

The method of the present invention will now be described. With the equipment set up as described, impulsive noise is monitored for a period of time by the noise sensors 27, 29 and the receiver 15. This allows the operator to see the amplitude of the impulsive noise and allows the determination of a threshold noise value for each type of impulsive noise. The noise is monitored for about one to five minutes. This noise baseline can be acquired before, during, or after data acquisition.

The threshold is determined from the noise record by any one of several methods. For example, one method involves dividing the noise record into windows of equal intervals of time. For each window, the absolute value of the time samples of the noise is determined and then those absolute values are averaged together. Then, the maximum and the minimum values are determined. The maximum value occurs at the noisiest time. Then, using a range of threshold values between the maximum and the minimum, the percentage of time that each threshold value is exceeded in the entire time series is calculated. A plot of percentage of time versus threshold values is made. The plot provides quantitative information on the impulsive noise, especially as it relates to continuous noise which is typically of the same amplitude as the geophysical signal of interest. A suitable threshold value is selected using the plot such that the threshold will reject most of the impulsive noise. In processing the data, 10–40% of the signal record time series is typically rejected as being noisy.

Next, the electromagnetic signal is received simultaneously with the impulsive noise. The receiving antenna or magnetometer 13 measures the electromagnetic signal so as to create a signal record time series (see FIG. 3). Respective noise sensors 27, 29 measure the respective types of impulsive noise so as to create respective noise record time series (see FIG. 2 which shows the noise record from the noise sensor 27). In magnetotelluric exploration, the natural electromagnetic signal is received with the receiving antenna 13, by switching on the receiving channel and acquiring data. In controlled-source electromagnetic exploration, the transmitter is operated to induce current into the ground, and the resulting electromagnetic signal is received by the receiving antenna.

Figure 2:
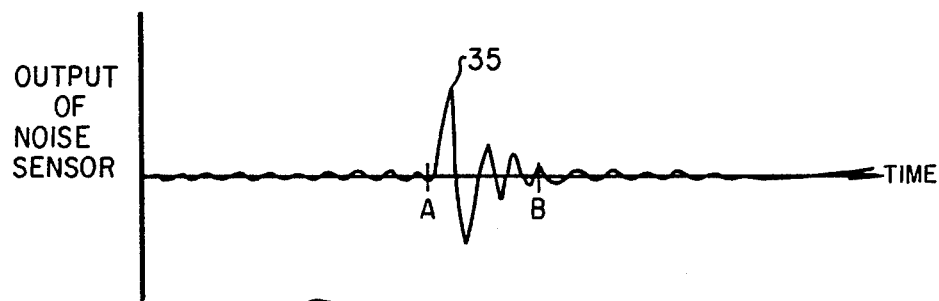
FIG. 2 is a graph showing the output of the impulsive noise sensor.
Figure 3:
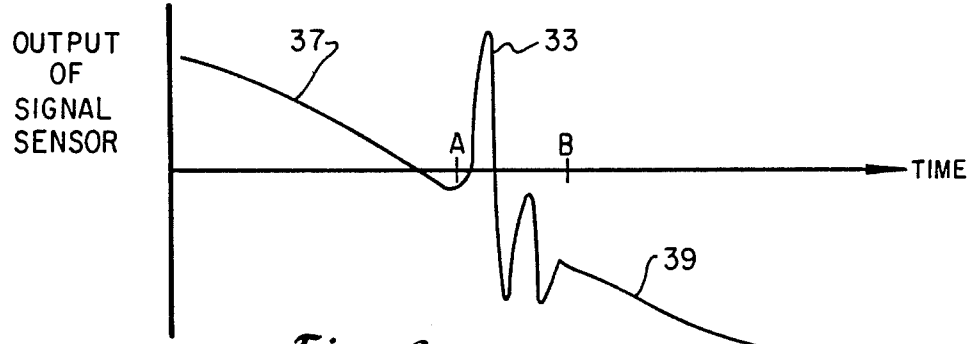
FIG. 3 is a graph showing the output of the receiving sensor.

In FIG. 3, there is shown an electromagnetic signal received by the receiving antenna 13. The middle portion of the electromagnetic signal has a large impulsive disturbance 33 which is most likely to be impulsive noise. This is confirmed by examining the outputs of the impulsive noise sensors. In FIG. 2, which shows the output of the motion sensor 27, as measured simultaneously with the electromagnetic signal, there is indeed impulsive noise 35 detected in the middle portion of the noise record.

The received electromagnetic signals from the receiving antenna 13 are processed to remove the impulsive noise 33. The impulsive noise 33 is removed by deleting that portion of the signal that contains the impulsive noise. The time A of the initial occurrence of the impulsive noise and the time B of the final occurrence of the impulsive noise are used to determine when to respectively begin and end the deletion of data from the received signal. For the electromagnetic signal of FIG. 3, the data from times A to B is deleted from the records. The respective times A, B of the initial and final occurrence are determined using the threshold noise values. The amplitude of the noise record in FIG. 2 is compared, at select instances of time, to the threshold noise level. Portions of the noise record that exceed the threshold are considered to be occurrences of impulsive noise. Impulsive noise received by the noise magnetometer 29 is similarly removed from the data.

The deletion of data leaves the signal record segmented. Thus, in FIG. 3, there are two segments of usable data; a first portion 37 occurring in time before the impulsive noise portion 33, and a second portion 39 occurring in time after the impulsive noise portion. A continuous, unsegmented signal record is obtained by stacking multiple signal records, which signal records have been processed to remove the impulsive noise portions. Because the impulsive noise is randomly distributed in time, stacking effectively merges the segments of the signal records together to produce a continuous processed record.

The foregoing disclosure and the showings made in the drawings are merely illustrative of the principles of the invention and are not to be interpreted in a limiting sense.

I claim:

1. A method of reducing impulsive noise in electromagnetic geophysical data, comprising the steps of:
    (a) providing receiving antenna means for receiving an electromagnetic signal, said receiving antenna means receiving impulsive noise;
    (b) providing noise sensor means for receiving said impulsive noise and placing said noise sensor means so as to receive the impulsive noise that is received by said receiving antenna means and so as to minimize the reception of said electromagnetic signal;
    (c) simultaneously receiving said electromagnetic signal with said receiving antenna means so as to create a signal record and receiving said impulsive noise with said noise sensor means so as to create a noise record;
    (d) examining said noise record for occurrences of said impulsive noise by comparing said noise record with a threshold noise value and identifying those instances of time in which said noise record exceeds said threshold;
    (e) removing those portions of said signal record which are simultaneous with said identified instances in which said noise records exceeds said threshold, wherein said signal record has reduced impulsive noise.

2. The method of claim 1, wherein said impulsive noise comprises motion noise caused by movement of said receiving antenna means in the earth's magnetic field, said noise sensor means comprising a motion sensor, said motion sensor being firmly coupled to said receiving antenna means so as to detect movement of said receiving antenna means.

3. The method of claim 1, wherein said impulsive noise comprises electromagnetic impulsive noise, said noise sensor means comprising electric or magnetic field sensor means.

4. The method of claim 1 wherein:
    (a) said impulsive noise further comprises motion noise caused by movement of said receiving antenna means in the earth's magnetic field, said noise sensor means comprising a motion sensor, said motion sensor being firmly coupled to said receiving antenna means so as to detect movement of said receiving antenna means;
    (b) said impulsive noise further comprises electromagnetic impulsive noise, said noise sensor means comprising electric or magnetic field sensor means.

5. The method of claim 1 wherein said threshold is determined by monitoring said impulsive noise with said noise sensor means.

6. A method of reducing impulsive noise in electromagnetic geophysical data, comprising the steps of:
   (a) providing receiving antenna means for receiving an electromagnetic signal, said receiving antenna means receiving impulsive noise, said receiving antenna means being located adjacent to the earth;
   (b) providing noise sensor means for receiving said impulsive noise, and placing said noise sensor means so as to receive the impulsive noise that is received by said receiving antenna means and so as to minimize the reception of said electromagnetic signal;
   (c) simultaneously receiving said electromagnetic signal with said receiving antenna means so as to create a signal record and receiving said impulsive noise with said noise sensor means so as to create a noise record;
   (d) creating plural signal records from plural received electromagnetic signals and plural respective simultaneous noise records;
   (e) examining each of said noise records for occurrences of said impulsive noise by comparing said respective noise record with a threshold noise value, and identifying those instances of time in which said respective noise record exceeds said threshold;
   (f) removing those portions of each of said signal records which are simultaneous with said identified instances in which said respective noise record exceeds said threshold, wherein said signal records have reduced impulsive noise;
   (g) stacking said plural signal records so as to produce a continuous processed electromagnetic signal.

7. The method of claim 6 further comprising the steps of receiving for a period of time said impulsive noise with said noise sensor means so as to measure said impulsive noise and determining a threshold value from said measurements.

8. The method of claim 7, wherein said impulsive noise comprises motion noise caused by movement of said receiving antenna means in the earth's magnetic field, said noise sensor means comprising a motion sensor, said motion sensor being firmly coupled to said receiving antenna means so as to detect movement of said receiving antenna means.

9. The method of claim 7, wherein said impulsive noise comprises electromagnetic impulsive noise, said noise sensor means comprising electric or magnetic field sensor means.

10. The method of claim 7 wherein:
    (a) said impulsive noise further comprises motion noise caused by movement of said receiving antenna means in the earth's magnetic field, said noise sensor means comprising a motion sensor, said motion sensor being firmly coupled to said receiving antenna means so as to detect movement of said receiving antenna means;
    (b) said impulsive noise further comprises electromagnetic impulsive noise, said noise sensor means comprising electric or magnetic field sensor means.

11. The method of claim 6, wherein said impulsive noise comprises motion noise caused by movement of said receiving antenna means in the earth's magnetic field, said noise sensor means comprising a motion sensor, said motion sensor being firmly coupled to said receiving antenna means so as to detect movement of said receiving antenna means.

12. The method of claim 6, wherein said impulsive noise comprises electromagnetic impulsive noise, said noise sensor means comprising electric or magnetic field sensor means.

13. The method of claim 6 wherein:
    (a) said impulsive noise further comprises motion noise caused by movement of said receiving antenna means in the earth's magnetic field, said noise sensor means comprising a motion sensor, said motion sensor being firmly coupled to said receiving antenna means so as to detect movement of said receiving antenna means;
    (b) said impulsive noise further comprises electromagnetic impulsive noise, said noise sensor means comprising electric or magnetic field sensor means.

* * * * *